United States Patent

[11] 3,559,888

| [72] | Inventor | Louis F. Miklos |
| | | 6151 Delaware St., |
| | | Gary, Ind. 46409 |
| [21] | Appl. No. | 776,523 |
| [22] | Filed | Nov. 18, 1968 |
| [45] | Patented | Feb. 2, 1971 |

[54] LAWN SPRINKLER WITH FLEXIBLE NOZZLE
3 Claims, 5 Drawing Figs.
[52] U.S. Cl. ................................................ 239/242,
239/602
[51] Int. Cl. ....................................................... B05b 3/16
[50] Field of Search ........................................... 239/195,
237, 240, 242, 602

[56] References Cited
UNITED STATES PATENTS
| 2,945,385 | 7/1960 | Nelson | 239/242X |
| 2,952,413 | 9/1960 | Jepson | 239/242 |

*Primary Examiner*—M. Henson Wood, Jr.
*Assistant Examiner*—Michael Y. Mar
*Attorney*—Walter Leuca

ABSTRACT: An improvement in a lawn sprinkler which conventionally employs a horizontally disposed, fixedly arched or bowed tube, having orifices therein, which oscillates to and fro to distribute the water in a fixed fan shape, comprising the replacement of the fixedly arched or bowed tube with a manually flexible, elastomeric tube, having orifices therein, so that the curvature of the arch or bow thereof may be manually changed in situ to provide sprays of select dimension.

PATENTED FEB 2 1971      3,559,888

INVENTOR.
LOUIS F. MIKLOS
BY Walter Lewis
ATTORNEY

LAWN SPRINKLER WITH FLEXIBLE NOZZLE

This invention relates to lawn sprinklers and more particularly to a lawn sprinkler having a flexible nozzle for varying the pattern of water coverage of the sprinkler by flexing the nozzle.

My invention is intended as an improvement over lawn sprinklers which employ arcuately shaped nozzles which oscillate to and fro during the sprinkling operation. The prior art oscillating lawn sprinklers generally include spaced skids which serve as a base and a frame for supporting a water-driven motor. The rotary motion thereof is translated to a rocking or oscillating motion by link means which connects the arcuate nozzle supported at its ends for rocking motion. The arcuate nozzle, in general, is an elongated conduit such as a tube having a series of spaced orifice openings along the length thereof. One end of the tube is connected to a coupling which communicates with the water source pipe. The other end of the tube is blocked so that the water therein is discharged therefrom through the orifices in the form of a fan-shaped spray. The ends of the tube are journaled on bracket members connected to the frame.

A serious disadvantage of the prior art sprinkler above described is that since the tube of the nozzle is made from a rigid set material which was worked or bent into a bow or arc shape, the chordal length of the fan shape spray is permanently determined by the curvature of the arc. Consequently, it is not possible to sprinkle an area which is less in width than the chordal length of the spray fan without watering outside the limits of the area to be sprinkled such as an adjacent wall, building, or an adjacent lawn.

Accordingly, the general objective of my invention is to provide a simple and economical means for an oscillating-type sprinkler to control the chordal length of a spray fan.

A more specific object of my invention is to replace the fixed bow or arch spray tube of the prior art oscillating sprinkler with a flexibly bowed or arched tube.

Another object of my invention is to provide means for selectively adjusting the curvature of the spray tube arc to regulate the chordal length of the spray fan.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

Figure 1:
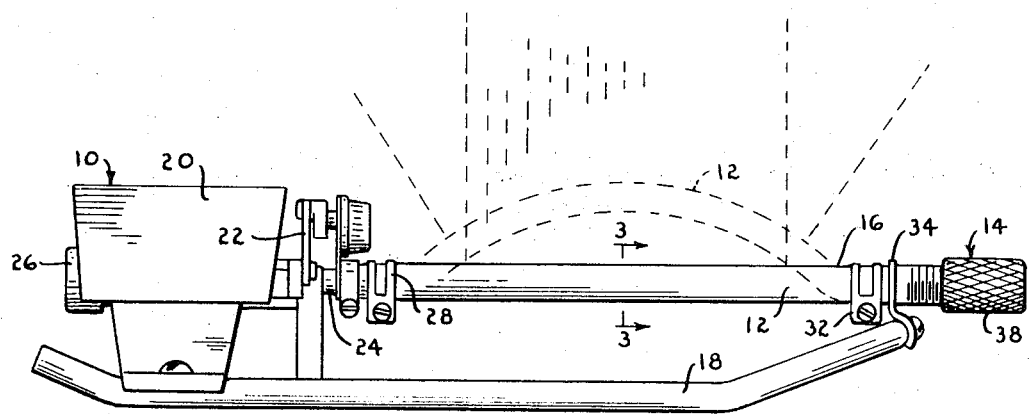
FIG. 1 is a side view of the sprinkler of my invention showing in dotted lines the range of flexibility of the nozzle and the accompanying variations in the width of the spray fan.
Figure 3:
FIG. 3 is a cross-sectional view of the spray tube taken along line 3-3 of FIG. 1.
Figure 2:
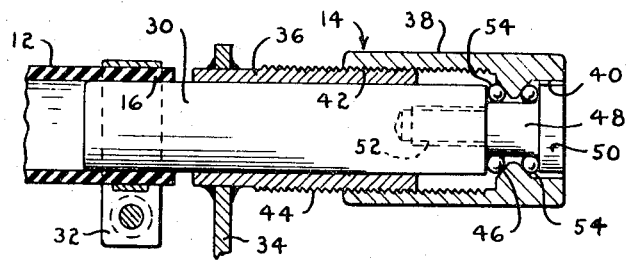
FIG. 2 is a detail of the means for adjusting the curvature of the spray tube in longitudinal section.

Referring now to the drawings in detail wherein for the purpose of illustration there is disclosed a preferred embodiment of the present invention, the numeral 10 represents an oscillating-type lawn sprinkler conventionally constructed in part. My invention comprises the combination thereof with a resiliently flexible spray tube nozzle 12 and an adjusting device 14 connecting the distal end 16 of nozzle 12 which is manually operable to advance axially to impart an arched curvature to nozzle 12 and vary the chordal length of the curvature thereof. More specifically my invention is used in connection with a lawn sprinkler which includes the conventional spaced skids 18 on which is mounted at one end thereof a casing 20 for housing a gear reduction assembly which drives link device 22 connected to impart an oscillatory motion to water outlet pipe 24. Water outlet pipe 24 communicates through casing 20 with water inlet pipe and coupling 26 to which the water line is connected. The flow of water therethrough drives an impeller in casing 20 which is connected to a gear train and ultimately to the oscillating link device 22. This is in general conventional structure. As stated above, my invention resides in the use of a flexible tube 12 in place of the rigidly shaped tube. One end of flexible tube 12 is connected by means of clamp 28 to outlet pipe 24 which is supported to oscillate by link device 22 connected thereto. The distal end 16 of flexible tube 12 is connected to a support member such as shaft 30 of adjusting device 14 by means of clamp 32. Adjusting device 14 is mounted on the upwardly sloped end of runners 18 opposite casing 20 by any convenient means such as bracket 34. With reference to FIG. 2, bracket 34 supports an externally threaded sleeve 36 in which is fitted axially and rotatably slidable shaft 30. Shaft 30 is solid at least in part for blocking the passageway opening of end 16, and serves as a longitudinal extension to tube 12 for sliding and rotational movement in sleeve 36. Turn knob 38 is provided with a hole 40 therethrough, one end thereof being threaded as at 42 to screw engage the external threads 44 of sleeve 36. The other end of the hole 40 is provided with an annular rim 46 to form a restricted throat section in hole 40 allowing passage therethrough of the shank portion 48 of a circular headed screw 50. The threaded end of screw 50 is screwed into a threaded hole 52 in the end of shaft 30 to abut the end of shank portion 48 to screw 50 against the end of shaft 30. This construction provides bearing raceways between the circular head of screw 50 and the facing side thereto of annular rim 46, and the end of shaft 30 and the facing side thereto of the annular rim. Ball bearings 54 are provided in these raceways for fascilitating rotational movement of knob 38 and to allow rotation thereof independent of shaft 30. The axial movement of shaft 30 results from the lead advance of the threaded knob 38 on the threaded sleeve 36.

Figure 4:
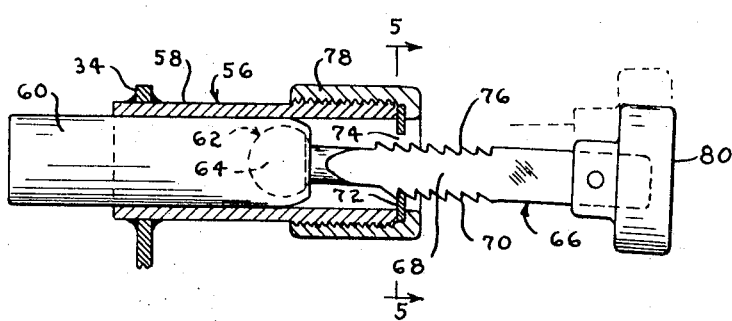
FIG. 4 is a detail of another means for adjusting the curvature of the spray tube in longitudinal section.
Figure 5:
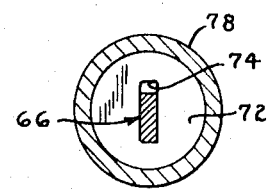
FIG. 5 is an end view of the adjusting device shown sectioned along line 5-5 of FIG. 4.

Whereas FIG. 2 illustrates an adjusting device 14 by which fine curvature adjustment of flexible tube 12 is obtained, it is relatively expensive to manufacture. Illustrated in FIG. 4 is a modified nozzle adjusting device 56 for adjusting the curvature of flexible tube 12 which is simpler and more economical to manufacture. It comprises a sleeve 58 fixed to bracket 34 at one end thereof. The other end of sleeve 58 is externally threaded. Sleeve 58 slidably receives therein a shaft 60 to which is connected end 16 of flexible tube 12. The other end of shaft 60 is formed with a socket 62 which is formed to contain a ball member 64 for swivel connection therebetween. Ball member 64 is the terminal end of lever 66 which further comprises bar portion 68 having notches 70 in the form of serrations for retentive engagement with end plate 72 at slotted aperture 74 therein through which lever 66 longitudinally and pivotally moves. The serrated notches 70 on one edge of lever 66 are formed for retentive engagement against end plate 72 when lever 66 is moved in one direction, and for slip engagement therewith when moved in the opposite direction. Notches 70 retentively engage the inside face of end plate 72 at the slotted aperture 74 to maintain tube 12 in the bowed position; while notches 76 retentively engage the outside face of end plate 72 to maintain tube 12 in a straightened position if required. Serrated notches 76 on the opposite edge of lever 66 are formed for slip engagement with end plate 72 when lever 66 is moved in the one direction, and retentive engagement therewith when moved in the opposite direction. End plate 72 is provided at the end of sleeve 56 and retained thereon by any convenient means such as internally threaded collar 78 which is screw fitted to the threaded end of the sleeve. Lever 66 is manually movable pivotally and longitudinally. Knob 80 is connected to the end of lever 66 and serves as a handle by which lever 66 is moved pivotally and longitudinally. Serrated notches 70 serve to retain tube 12 flexed at a select curvature and serrated notches 76 serve to retain tube 12 in a rectilinear position.

In the operation of my invention, tube 12 which I prefer to be formed from ordinary hose rubber for purposes of economics and availability, is arched or provided with a bow of desired curvature by manually lifting or depressing the center of tube 12 while simultaneously adjusting knob 38 or lever 66 of adjusting devices 14 or 56, respectively, to take up the slack in either direction. Accordingly, providing a tube 12 which is flexible allows placing it in different curvilinear positions. The line of direction of the orifices spaced along the length thereof, can be shifted at will since they are normal to the tangent at their respective locations on the curve and changing the curve of the bow will correspondingly change the line of direction of the orifices.

While a particular embodiment of the present invention have been herein illustrated and described, it is not intended to limit the invention to such disclosure, but changes and modifications may be made therein and thereto within the scope of the following claims.

I claim:

1. A lawn sprinkler device comprising:
   a base;
   motive means on said base;
   a water outlet conduit mounted for oscillatory rotation by said motive means;
   support means on said base axially spaced from said outlet conduit, said support means including:
   a sleeve member provided with threads,
   a shaft member slidably movable in said sleeve member, and
   means for maintaining said shaft member in said sleeve member at a select axial position, said means including a cylindrically hollow knob member having one end portion thereof internally provided with threads for engaging the threads of said sleeve member, and the other end portion thereof internally provided with an annular rim to provide a restricted passage through said cylindrical hollow; and means connecting the other end of said shaft member and said annular rim for joint axial movement thereof and relative rotational movement therebetween; and
   a manually flexible tube connecting said water outlet conduit at one end of said tube and one end of said shaft member at the other end of said tube, said tube having a plurality of orifices spaced along the length thereof.

2. The lawn sprinkler device of claim 1 wherein said other end of said shaft member is further characterized as having a butting engagement with one side of said annular rim, and said means of said cylindrically hollow knob member is further characterized as a screw member removably connected to said other end of said shaft member through said restricted passage, the head of said screw member being in butting engagement with the other side of said rim 3. A lawn sprinkler device comprising:
   a base;
   motive means on said base;
   a water outlet conduit mounted for oscillatory rotation by said motive means;
   support means on said base axially space spaced from said outlet conduit, said support means including:
   a sleeve member,
   a shaft member slidably movable in said sleeve member, and
   means for maintaining said shaft member in said sleeve member at a select axial position, said means including a plate member having as a slotted aperture therein fixed to the end of said sleeve, a lever member longitudinally movable through said slotted aperture in said plate member, said lever member swivally connected to said shaft member in said sleeve member; and notches on said lever member for select retentive engagement with said plate member; and
   a manually flexible tube connecting said water outlet conduit at one end of said tube and one end of said shaft member at the other end of said tube, said tube having a plurality of orifices spaced along the length thereof.